United States Patent
Zettler et al.

(10) Patent No.: US 7,505,150 B2
(45) Date of Patent: Mar. 17, 2009

(54) DEVICE AND METHOD FOR THE MEASUREMENT OF THE CURVATURE OF A SURFACE

(75) Inventors: Thomas Zettler, Berlin (DE); Guenther Strassburger, Lostau (DE); Armin Dadgar, Berlin (DE); Alois Krost, Berlin (DE)

(73) Assignee: Laytec GmbH, Berlin (DE)

( * ) Notice: Subject to any disclaimer, the term of this patent is extended or adjusted under 35 U.S.C. 154(b) by 159 days.

(21) Appl. No.: 11/383,004

(22) Filed: May 12, 2006

(65) Prior Publication Data
US 2007/0030493 A1 Feb. 8, 2007

Related U.S. Application Data

(60) Provisional application No. 60/681,005, filed on May 13, 2005.

(51) Int. Cl.
*G01B 11/24* (2006.01)
*G01B 11/30* (2006.01)
(52) U.S. Cl. ...................... 356/612; 356/601
(58) Field of Classification Search ............. 356/43, 356/50, 124, 601, 602, 608, 611, 612, 445, 356/511–513; 250/340, 341.1, 341.6, 341.8
See application file for complete search history.

(56) References Cited

U.S. PATENT DOCUMENTS

| 4,374,328 | A | * | 2/1983 | Tekippe et al. ............ 250/458.1 |
| 4,525,627 | A | * | 6/1985 | Krempl et al. ............... 250/345 |
| 5,067,817 | A | | 11/1991 | Glenn |
| 5,251,010 | A | | 10/1993 | Malthy, Jr. |
| 5,912,738 | A | | 6/1999 | Chason et al. |
| 6,072,179 | A | * | 6/2000 | Paniccia et al. .......... 250/341.4 |
| 2001/0013936 | A1 | * | 8/2001 | Nielsen et al. ............... 356/601 |
| 2003/0227618 | A1 | * | 12/2003 | Some ...................... 356/237.1 |
| 2005/0286055 | A1 | * | 12/2005 | Wang ......................... 356/445 |

FOREIGN PATENT DOCUMENTS

DE 203 06 904 U1 9/2003

* cited by examiner

*Primary Examiner*—Gregory J Toatley, Jr.
*Assistant Examiner*—Tri T Ton
(74) *Attorney, Agent, or Firm*—Noris McLaughlin & Marcus; Bruce S. Londa

(57) ABSTRACT

The invention relates to a device and a method for the measurement of the curvature of a surface (1), which is more exact and less expensive than prior art devices. The device comprises a light source (2) for the irradiation of a light beam (3) onto the surface (1), in which a birefingent element (4) is arranged between light source (2) and surface (1), in which furthermore a detector (5) is arranged for the detection of the partial beams (6,7), that are reflected from the surface (1), and at least one main axis (17) of the birefringent element (4) is positioned with respect to the light beam (3) of the light source (2) in such a way, that the light beam (3) of the light source (2) is split up into at least two parallel beams (6,7).

26 Claims, 5 Drawing Sheets

DEVICE AND METHOD FOR THE MEASUREMENT OF THE CURVATURE OF A SURFACE

Figure 1A:
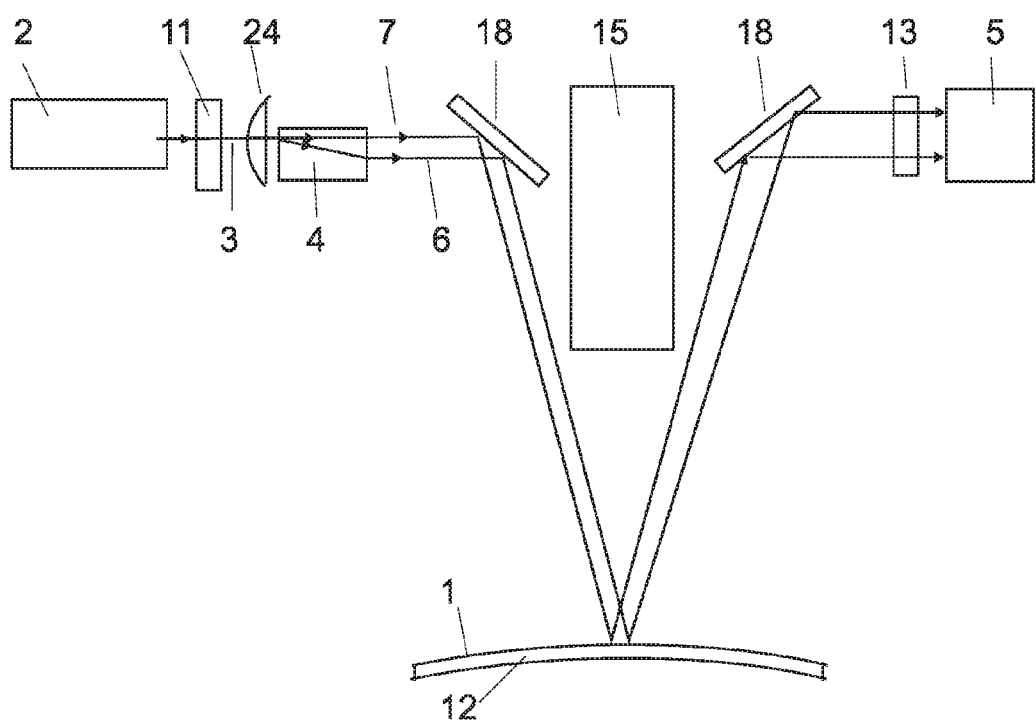

The invention relates to a device and a method for the measurement of the curvature of a surface with the features stated in the patent claims 1, 15 and 25.

For the fabrication of semiconductor wafers the according growth processes has to be controlled in dependence of different parameters as for example the growing layer thickness, the temperature, the doping concentration or the smoothness of the wafer surface. Among others, it is therefore necessary to have accurate knowledge about the curvature of the wafer surface during the fabrication process. In particular during the fabrication of wafers in multi wafer reactors it is necessary to determine the surface curvature of the wafer as exactly as possible in the shortest possible time.

From U.S. Pat. No. 5,912,738 a device is known for the measurement of the curvature of a surface, in which a light beam is split into an array of parallel light beams by means of a first and a second etalon, whereby this parallel light beams are reflected at the surface to be measured and the curvature of the surface is derived from the distribution of the individual light spots (in particular their distance to each other) in a detector plane.

One disadvantage of this device is in particular, that no perpendicular irradiation of the parallel light beams onto the sample is possible, as otherwise the irradiation optics and the detector plane would coincide. A further disadvantage is, that the partial beams split by the etalons show noticeably different intensities (in the range of some orders of magnitude), such that the detection of this light beams requires a detector sensitive over a wide intensity-range that leads to extraordinary expenses. In particular because of the different intensities and the large number of partial beams, it is not possible to carry out fast measurements of the surface curvature so quickly, as necessary for example on rotating wafers in multi wafer reactors.

Furthermore from DE 203 06 904 U1 a device is known for the measurement of the layer thickness and the bending of an at least partially reflecting surface, in which the device comprises means for the irradiation of the layer surface with at least two nearly parallel light beams, in which the light beams impinging onto the surface and those being reflected from the layer surface are guided nearly parallel and the device shows a beam splitter for the separation of the incident light beam and the light beam reflected from the surface, in which furthermore a line detector or an array detector for the measurement of the distance of at least two light beams, that are reflected from the surface and impinge onto the reflector, as well as means for the measurement of the intensities of the light beams reflected from the surface or of the overall intensity as a measure for the layer thickness are provided.

Advantageously by means of this device a perpendicular irradiation of the light beams intended to be used for the curvature measurement of the surface can be implemented. Such a perpendicular irradiation is important in many cases, as the size of the windows available at semiconductor deposition equipments is usually highly limited.

However it is also detrimental in the aforementioned device, that the at least two partial beams split up by means of etalon and mirror do not exhibit the same intensity. Through this problems with the detection arise again, in particular the detector must be designed sensitive over a large intensity-range that leads to a considerable disadvantage concerning the costs, furthermore a fast measurement within a short time interval is problematic because of the different intensities. (Large integration time for partial beams with small intensity, in particular, if the samples show a low degree of reflection due to the fabrication process).

It is therefore the object of the present invention to provide a device and a method for the measurement of the curvature of a surface that overcomes the aforementioned disadvantages of the state of the art.

This object is solved by the features of the claims 1, 15 and 25.

Preferred embodiments of the invention are contained in the dependent claims.

A particular advantage of the device according to the invention is given by the fact, that the device according to the invention generates the same intensity in the optical partial beams, in which for given requirements concerning the accuracy of the curvature measurement the usage of a considerable cheaper detector (for example CCD-matrix or CMOS-sensor) becomes possible in comparison to the devices according to the state of the art. For this purpose the device for the measurement of the curvature of an at least partially reflecting surface of a sample shows a light source for the irradiation of a light beam onto the surface of the sample, whereas a birefringent element is arranged between light source and surface. Furthermore at least one main axis of the birefringent element is positioned with respect to the light beam of the light source in such a way, that the light beam of the light source is split up into two parallel partial beams, whereas the device furthermore comprises a detector to detect the partial beams reflected at the surface.

The idea of the invention is to generate two parallel partial beams with the same intensity by irradiating a preferably little divergent light beam (for example laser beam, but unpolarised white light is applicable, too) onto a birefringent element, for example a birefringent plate or a birefringent prism. If the incident light beam is polarised, the optical axis of the birefringent element must be adjusted with respect to the polarisation direction of the light beam in such a way, that the ordinary beam and the extra-ordinary beam run parallel and show the same intensity after passing through the birefringent element. Therefore it is necessary, that the incoming light beam impinge skew onto the optical axis of the birefringent element, so that the splitting into ordinary and extra-ordinary beam occurs.

If one uses polarised light, the distribution of the intensity between ordinary and extra-ordinary beam can be adjusted to the desired value by appropriate adjustment of the polarisation direction (usually same intensity).

The distance between the parallel running ordinary and extra-ordinary partial beams can be adjusted by the angle of inclination between partial beams and optical axis as well as by the thickness of the birefringent element.

Furthermore the device comprises means for the determination of the curvature of the surface from the distance between the partial beams detected by the detector after being reflected at the sample. This means can for example be implemented by a data processing device that calculates the curvature of the surface from the distance between the partial beams at the detector as well as from the specific lengths (for example between sample and detector as well as the distance between the partial beams before the reflection) according to mathematical laws.

By the implementation of the device according to the invention it is possible to generate parallel partial beams with the same intensity for the irradiation onto a bended surface in an outstandingly easy way. This has the advantage that also the reflected beams show nearly the same intensity, such that the detector must be able to work only in a very narrow sensitivity-range concerning the light intensity of the reflected partial beams. Through this it is possible to use an inexpensive detector. An additional advantage of the device according to the invention is given by the fact, that (because of the low requirements to the detector) due to the same intensities very fast measurements in very small time intervals can be carried out too, whereby also for rotating wafers a precise measurement can be carried out during their rotation, for example in a multi-wafer reactor.

In a preferred embodiment of the invention the device comprises a beam splitter that is arranged between light source and reflecting surface, whereby the light source is arranged with respect to the surface in such a way, that the light beam or the partial beams impinge perpendicularly or nearly perpendicularly onto the surface and the detector is arranged with respect to the beam splitter in such a way, that the partial beams reflected by the surface hit the detector. Through this it becomes possible according to the invention to irradiate the light beam for the measurement of the curvature of the surface in a perpendicular way that is necessary in many applications due to the reactors in use. The light source is preferably a semiconductor laser. In a preferred embodiment of the invention the radiation emitted by the light source comprises such a polarisation, that the partial beams comprise the same intensity or at least nearly the same intensity after passing the birefringent element.

In an additional preferred embodiment there is a cylindrical lens arranged between the surface and the detector in the optical path. Through this cylindrical lens advantageously an imaging of all beams, which are reflected at a possibly wobbling surface from one plane into one line of the detector, is put into practice. Thereby instead of an array-detector a line-detector can be used, leading to additional advantages concerning the expenses.

In an additional preferred embodiment of the invention the light source comprises at least two collinear-guided light sources, preferably laser light sources with different wavelengths. Through this a signal drop out due to of interference at a growing layer can be ruled out as far as possible, as the wavelengths of the collinear-guided light sources are chosen in such a way, that the minima in interference do not coincide in the range of the expected layer thickness. Additionally the intensity of the light source can be controlled, in order to counterbalance fluctuations in the signal that are caused by interferences.

In an additional preferred embodiment of the invention it is provided, that the devices additionally comprise means for the determination of characteristic parameters of the sample. Preferably the device for the determination of characteristic parameters of the sample is embodied by at least one pyrometer and a reflection-analysis unit as well as a means for the irradiation of light (for the reflection-analysis unit). The pyrometer preferably is an emissivity-corrected pyrometer. Preferably between the light source and the birefringent element a filter is placed for the suppression of disturbances during the temperature measurements (using a pyrometer).

In an additional preferred embodiment the light source for the curvature measurements as well as the light source for the optical reflection-analysis unit show means for blanking. The means for blanking allow for the elimination of processing light- and ambience light-artefacts.

The method according to the invention for the measurement of the curvature of an at least partially reflecting surface is characterised by the following process steps:
generation of a light beam (preferably little divergent),
splitting up the light beam in at least two parallel partial beams by means of at least one birefringent element,
reflection of the at least two partial beams at the surface of the sample,
detection of the distance between the reflected partial beams using a detector and
determination of the curvature of the surface from the distance between the reflected partial beams.

In a preferred embodiment of the method according to the invention the axis of the birefringent element is orientated respectively positioned with respect to the direction of the light beam in such a way that the resulting partial beams show an appropriate distance for the measurement of the curvature. Alternatively the thickness of the birefringent element can be changed too, in order to adjust the distance between the beams.

When using polarised light, the polarisation direction of the light beam for a given angle between the axis of the birefringent element and the light beam is adjusted in such a way that the partial beams have the same intensity. In an additional preferred embodiment (besides the determination of the curvature of the surface) the determination of characteristic parameters of the sample is carried out at the same time. Preferably the determination of characteristic parameters of the sample is carried out using a pyrometer and a reflection-analysis unit. In an additional preferred embodiment of the invention the light beam respectively the light beams used for the determination of the curvature are modulated. Thereby preferably a spectral-optical measurement can be carried out (at the same time) without any influence on the measurement of the curvature. In an additional preferred embodiment, it is planned to determine the roughness of the surface from the light scattering besides the determination of the curvature of the surface and the determination of characteristic layer parameter of the sample. For that purpose the widths of the reflected partial beams in the detector plane or the height of the unwanted signal at the reflection-analysis unit is used as a measure of the roughness of the surface. The device according to the invention for the measurement of the curvature of the surface respectively the method according to the invention for the measurement of the curvature of the surface can be used with extra advantage in a spectral-optical system for the measurement of characteristic layer parameters, as for example during growth processes in the semiconductor technology. On the one hand an inexpensive detector can be used, on the other hand due to the same intensity of the light beams impinging in a parallel way, it is possible to carry out a very fast measurement (due to the narrow intensity range of the detector, which enables a fast data evaluation).

Figure 1B:
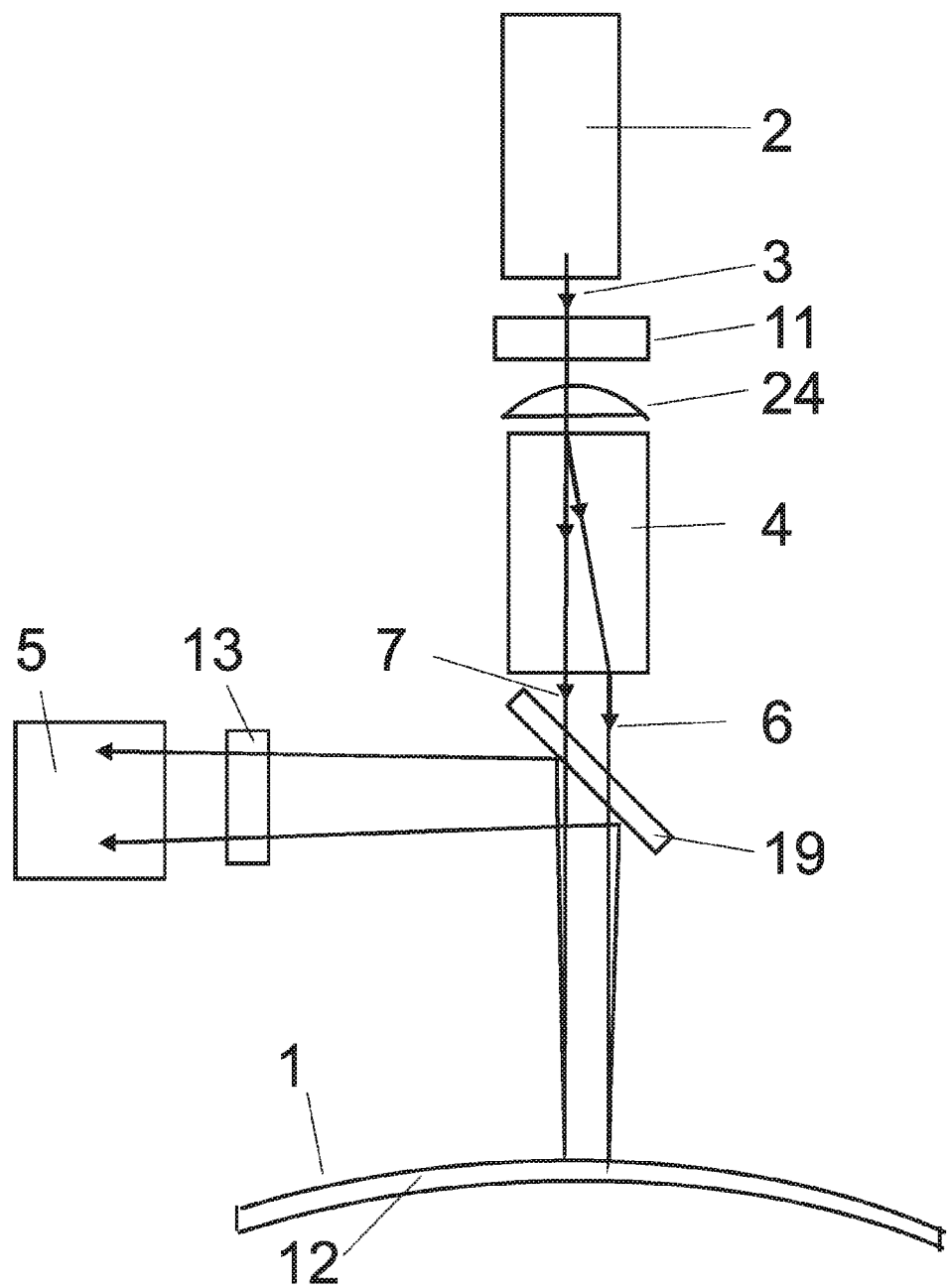
Figure 2:
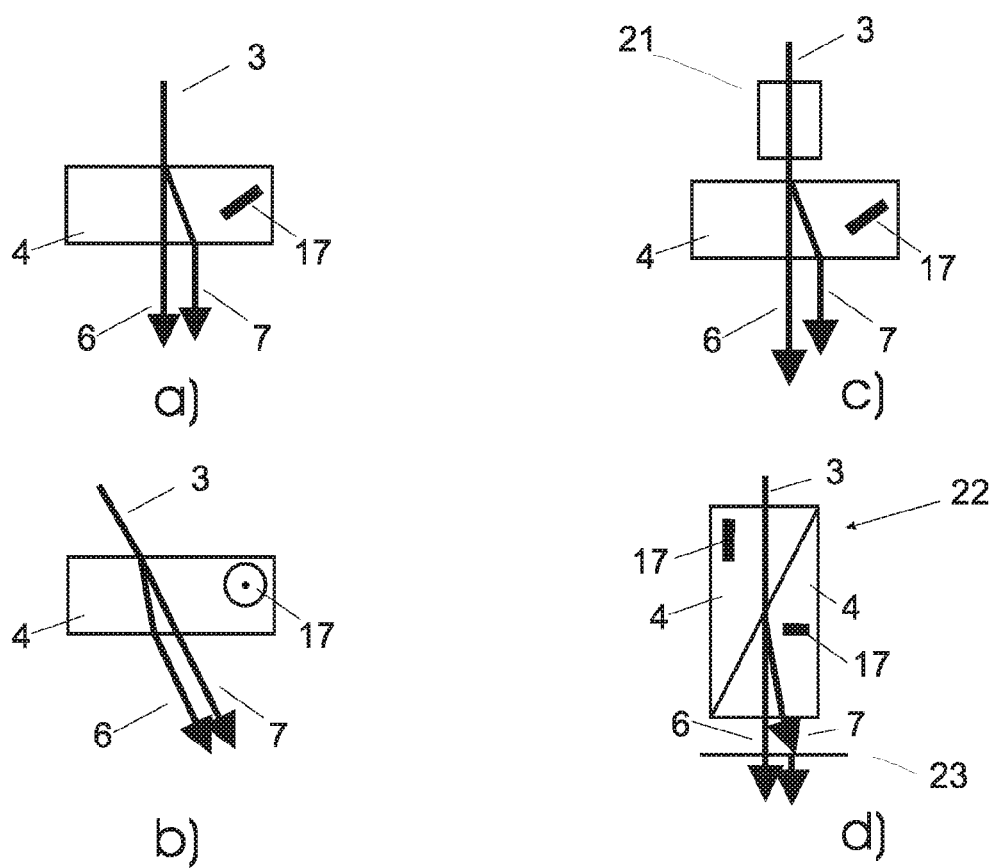
Figure 3:
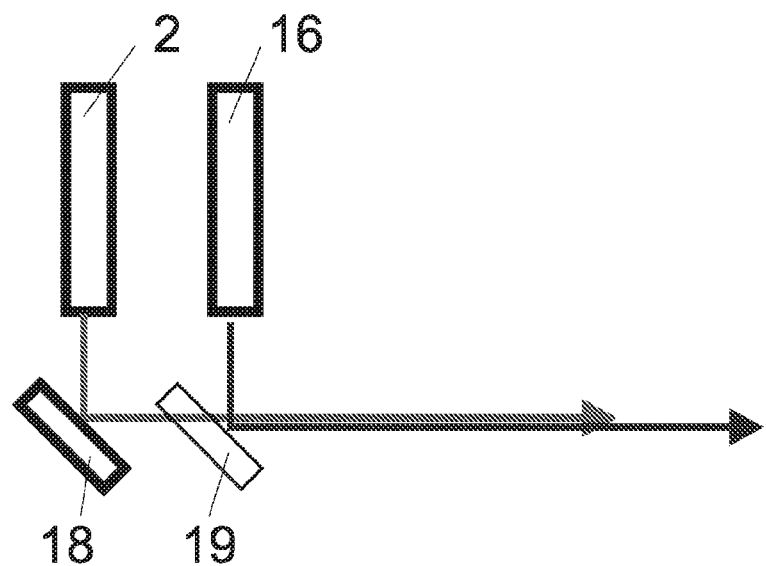
Figure 4:
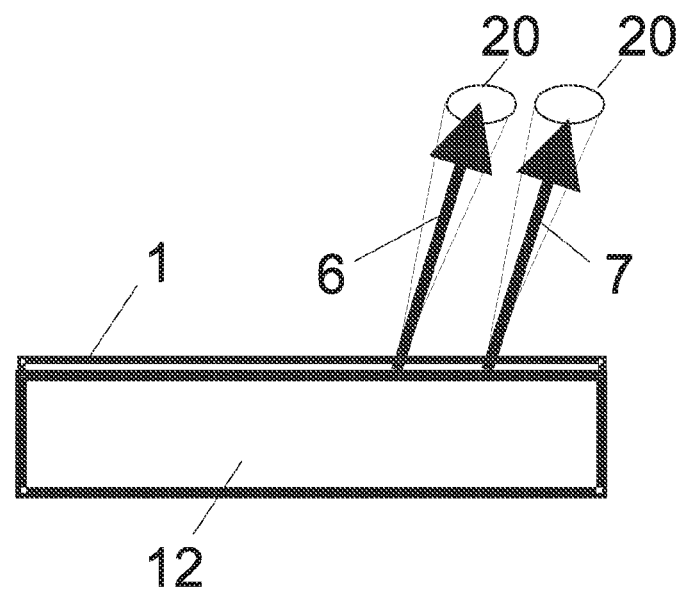
Figure 5:
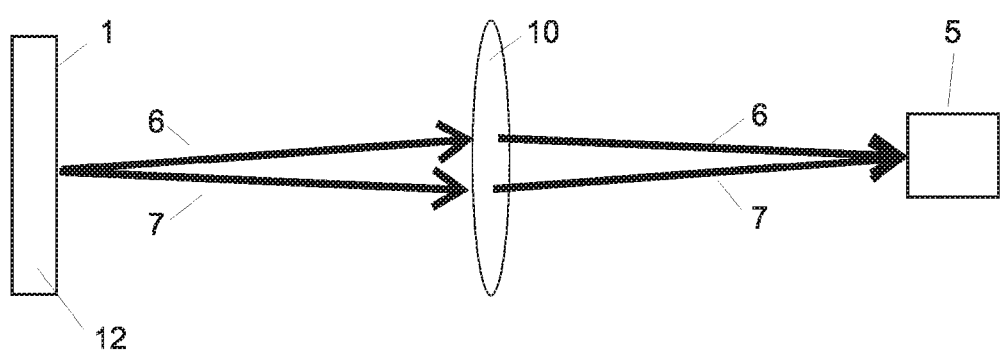

In the following the invention is explained in more detail with embodiment examples. It is shown in:

FIG. 1a a schematic section of a device according to the invention for the measurement of the curvature of a sample surface for skew incidence of the light beams, FIG. 1b a schematic section of a device according to the invention for the measurement of the curvature of a sample surface for perpendicular incidence of the light beams, FIG. 2a a schematic view of the principle of splitting up a light beam in two parallel partial beams with the same intensity at perpendicular incidence, FIG. 2b a schematic view of the principle of splitting up a light beam in two parallel partial beams with the same intensity at skew incidence, FIG. 2c a schematic view of the principle of splitting up a light beam in two parallel partial beams with the same intensity at perpendicular incidence after beam widening, FIG. 3 a schematic section of two collinear-guided laser light sources, FIG. 4 a schematic view of the determination of the roughness of the sample surface from the width of the reflected light due to light scattering and FIG. 5 the use of a cylindrical lens for the mapping of the beams reflected at a wobbling surface.

FIG. 1 shows a schematic section of a device according to the invention for the measurement of the curvature of a sample surface 1 for skew incidence of the light beams. The skew incidence might for example be necessary, as straight above the sample surface 1 a device for the determination of characteristic layer parameter, as for example a reflection-analysis unit 15, might be arranged. The semiconductor laser 2 generates the light beam 3, which is firstly guided through the filter 11 and the lens 24 into the birefringent element 4. The main axis (respectively one of the main axes) of the birefringent element 4 is oriented with respect to the light beam 3 in such a way that the light beam 3 is split up into two partial beams 6 and 7, whereas after leaving the birefringent element 4 the partial beams 6 and 7 are guided in a parallel way. The birefringent element 4 preferably comprises planar faces for light-entrance and -exit. Furthermore the light-entrance and -exit areas as well as the main axis of the birefringent element 4 are oriented with respect to the incident light beam 3 (taking into account the polarisation of the light beam 3) in such a way, that the partial beams 6 and 7 have the same or nearly the same intensity after leaving the birefringent element 4. Through this a cheap detector 5 with a small sensitivity range can be used, as the partial beams 6 and 7 that have to be detected at the detector 5 later on will there exhibit a same intensity. By means of a first tilted mirror 18 the partial beams 6 and 7 are guided onto the sample surface 1, at which they are at least partially reflected and thereafter guided to the detector 5, which can for example be designed as CCD-array, by the second tilted mirror 18 and the filter 13. In case the sample surface 1 comprises a convex shape, the distance between the partial beams 6 and 7 in the detector 5 will be larger than that at the sample surface 1. Via the known parameters (distance between the partial beams 6 and 7 at the sample surface 1, distance between the partial beams 6 and 7 at the detector 5 and distances and angles of the sample surface 1 with respect to the mirror 18 and to the detector 5) the curvature of the sample surface 1 can be calculated, which preferably is carried out by a device for data processing (not shown). The filter 11 serves for the suppression of unwanted emissions of the light source 2 and the filter 13 serves for the suppression of the thermal radiation of the sample 12.

FIG. 1b shows a schematic section of a device according the invention for the measurement of the curvature of a sample surface for perpendicular incidence of the light beams. The principle corresponds to that of FIG. 1a, but due to the perpendicular incidence of light the tilted mirrors 18 can be replaced by only one partially transmitting mirror 19, in doing so the number of components can further be reduced.

The particular advantage of the use of a birefringent element in the optical path consists in the inexpensive generation of parallel partial beams 6 and 7 of the same intensity, whereby for example an inexpensive detector 5 can be used.

FIG. 2a shows a schematic view of the principle of splitting up the light beam 3 into two parallel partial beams 6 and 7 with the same intensity at perpendicular incidence. For perpendicular incidence the birefringent element 4 splits up the light beam 3 into the ordinary partial beam 6 and the extraordinary partial beam 7. The main axis 17 (in accordance with the direction of the drawn line) of the birefringent element 4 is chosen with respect to the incoming light beam 3 (and its polarisation) in such a way, that after leaving the birefringent element the partial beams 6 and 7 show the same intensity. The distance between the partial beams 6 and 7 after leaving the birefringent element 4 is determined by the thickness of the birefringent element 4 (and the material). The same holds in an analogous way for FIG. 2b that demonstrates the principle of splitting up the light beam 3 into the parallel partial beams 6 and 7 with same intensity at skew incidence.

FIG. 2c shows a schematic view of the principle of splitting up of the light beam 3 into the parallel partial beams 6 and 7 with the same intensity at perpendicular incidence after a beam widening. The beam widening is implemented by a commercial beam widening optical system 21. So the beam is collimated in a better way and the following focusing optical system is better illuminated. As a result, sharper spots on the detector 5 are achieved and thus a better resolution of the curvature measurement.

FIG. 2d shows a schematic view of the principle of splitting up the light beam 3 into the parallel partial beams 6 and 7 with the same intensity at perpendicular incidence by means of an optical element 22 (Rochon-prism) that is composed of two optical elements 4 and a lens 23. Thereby the main axes 17 of the birefringent elements 4 are chosen in such a way, that the partial beams 6 and 7 have the same intensity after leaving the prism 22, however they do not yet run parallel. By the aid of additional optical elements, in this case a lens 23 the divergent light beams are deflected to parallel light beams.

It is thus crucial, that the birefringent element 4 is placed in such a way, that the partial beams 6 and 7 have the same intensity and run parallel to each other, if necessary by the use of additional optical elements. Preferably the partial beams 6 and 7 show the same intensity and run parallel after leaving the birefringent element 4 without the aid of additional optical elements.

FIG. 3 shows a schematic view of two collinear-guided laser light sources 2 and 16. Through this a signal drop out due to interference at a growing layer (sample 12) can be ruled out as far as possible as the wavelengths of the collinear-guided light sources 2, 16 are chosen in such a way, that the minima in interference do not coincide in the expected range of layer thickness of the sample 12.

FIG. 4 shows a schematic view of the determination of the roughness of the sample surface 1 from the width of the reflected light that is caused by light scattering. According to the roughness of the surface 1 of the sample 12 the cone of the scattered light 20 of the partial beams 6 and 7 will increase. From the diameter of the cone of the scattered light 20 of the partial beams 6 and 7 the roughness of the sample surface 1 can be derived.

FIG. 5 shows the use of a cylindrical lens 10 for the imaging of the beams 6 and 7 that are reflected at a wobbling surface 1. Through this cylindrical lens 10 advantageously an imaging of all beams 6 and 7 that are reflected at a possibly wobbling surface 1 from one layer into one line of the detector 5 is put into practice. Thereby instead of an array-detector an inexpensive line-detector can be used, leading to additional cost advantages.

REFERENCE SIGN LIST 1 surface
2 light source
3 light beam
4 birefringent element
5 detector
6 partial beam
7 partial beam
10 cylindrical lens
11 filter
12 sample
13 filter
15 reflection-analysis unit
17 optical axis of the birefringent element
18 tilted mirror
19 partially transmitting mirror 20 cone of the scattered light
21 beam widening optical system
22 Rochon-prism
23 lens
24 lens

The invention claimed is:

1. Device for measurement of a curvature of an at least partially reflecting surface of a sample, comprising a light source for irradiation of a light beam onto said surface, a birefringent element arranged between said light source and said surface, wherein light-entrance and -exit areas as well as a main axis of the birefringent element are oriented with respect to the light beam of the light source in such a way that the light beam is split up into at least two partial beams having substantially same intensities after leaving the birefringent element, wherein the at least two partial beams leave the birefringent element in parallel, and a detector for the detection of the partial beams reflected at the surface.

2. Device of claim 1, wherein the device comprises means for the determination of the curvature of the surface from the distance between the partial beams, which are detected by the detector.

3. Device according to claim 1, wherein the device comprises a partially transmitting mirror that is arranged between light source and reflecting surface, whereas the light source is arranged with respect to the surface in such a way, that the light beam or the partial beams impinge in a perpendicular or nearly perpendicular way onto the surface, whereas the detector is arranged with respect to the partially transmitting mirror in such a way, that the partial beams reflected at the surface impinge at first onto the partially transmitting mirror and the partial beams reflected from the partially transmitting mirror hit the detector.

4. Device according to claim 1, wherein the light source is a semiconductor laser.

5. Device according to claim 1, wherein the radiation emitted by the light source comprises such a polarization, that the partial beams have the same intensity after passing through the birefringent element.

6. Device according to claim 5, wherein the light source is a semiconductor laser with a polarising element.

7. Device according to claim 1, wherein a cylindrical lens is arranged between the surface and the detector.

8. Device according to claim 1, wherein the light source comprises at least two collinear-guided laser light sources with different wavelengths.

9. Device according to claim 1, wherein the device additionally comprises means for the determination of characteristic layer parameters of the sample.

10. Device according to claim 9, wherein the means for the determination of characteristic layer parameters of the sample comprises a means for the irradiation of light as well as a reflection-evaluation unit.

11. Device according to claim 10, wherein the means for the determination of characteristic layer parameters of the sample additionally comprises a pyrometer.

12. Device according to claim 11, wherein the pyrometer is an emissivity-corrected pyrometer.

13. Device according to claim 11, wherein between the light source and the birefringent element a filter is arranged for the suppression of unwanted emission from the light source.

14. Device according to claim 11, wherein the light source for the curvature-measurement and/or means for the irradiation of light for the determination of characteristic layer parameters comprise a means for blanking.

15. Device according to claim 2, wherein the means for the determination of the curvature of the surface from the distance between the reflected partial beams, which are detected from the detector, comprises a device for data processing.

16. Method for measurement of a curvature of an at least partially reflecting surface of a sample, comprising the steps of:
providing a light source for irradiation of a light beam onto said surface;
providing a birefringent element arranged between said light source and said surface and arranging light-entrance and -exit areas as well as a main axis of the birefringent element with respect to the light beam of the light source in such a way that the light beam is split up into at least two partial beams having substantially same intensities after leaving the birefringent element;
generating and splitting up of a light beam into at least two partial beams using the birefringent element, wherein the at least two partial beams leave the birefringent element in parallel;
reflecting the at least two partial beams at the surface of the sample;
detecting the distance between the reflected partial beams using a detector; and
determining the surface curvature from the distance between the reflected partial beams.

17. Method according to claim 16, wherein the main axis of the birefringent element with respect to the beam direction of the incident light beam is oriented in such a way, that after leaving the birefringent element the partial beams comprise a default distance towards each other.

18. Method according to claim 16, wherein for a given angle between the main axis of the birefringent element and the light beam, the polarization direction of the light beam is adjusted in such a way, that the partial beams have the same intensity.

19. Method according to claim 16, wherein a determination of characteristic layer parameters of the sample is carried out at the same time.

20. Method according to claim 19, wherein the determination of characteristic layer parameters of the sample is performed by means of a pyrometer and a reflection-analysis unit.

21. Method according to claim 16, wherein the light beam and/or the partial beams are blanked or modulated.

22. Method according to claim 16, wherein the roughness of the surface is derived from the width of the detected partial beams, which is caused by light scattering, or from the size of the unwanted signal of the reflection-analysis unit.

23. Method according to claim 22, wherein the wobbling amplitude of the sample is derived from the amplitude of the oscillations of at least one of the beam centres of the two partial beams, which is caused by the wobbling of the sample.

24. Method according to claim 16, wherein from the unwanted signal detected by the reflection-analysis unit that is generated by at least one of the partial beams during reflection at the sample and comprises another wavelength than the light emitted from the light source, the photoluminescence properties of the sample are derived.

25. Device according to claim 1, wherein the birefringent element is a birefringent plate or a birefringent prism.

26. Device according to claim 1, wherein the at least two partial beams leaving the birefringent element in parallel consist of an ordinary beam and an extra-ordinary beam.

* * * * *